US012753633B2

(12) United States Patent
Capehart et al.

(10) Patent No.: US 12,753,633 B2
(45) Date of Patent: Oct. 6, 2026

(54) APPARATUS AND METHOD FOR DECODING A KEYED LOCK CYLINDER

(71) Applicants: Keith Capehart, Biloxi, MS (US); Brian Capehart, Gulfport, MS (US)

(72) Inventors: Keith Capehart, Biloxi, MS (US); Brian Capehart, Gulfport, MS (US)

( * ) Notice: Subject to any disclaimer, the term of this patent is extended or adjusted under 35 U.S.C. 154(b) by 90 days.

(21) Appl. No.: 18/988,063

(22) Filed: Dec. 19, 2024

(65) Prior Publication Data

US 2025/0198194 A1 Jun. 19, 2025

Related U.S. Application Data

(60) Provisional application No. 63/611,906, filed on Dec. 19, 2023.

(51) Int. Cl.
*E05B 19/00* (2006.01)

(52) U.S. Cl.
CPC ................................ *E05B 19/0011* (2013.01)

(58) Field of Classification Search
CPC ................................................. E05B 19/0011
See application file for complete search history.

(56) References Cited

U.S. PATENT DOCUMENTS 2,727,312 A * 12/1955 Tampke ................ E05B 19/205 70/394
4,517,746 A * 5/1985 Easley .................. E05B 19/205 70/394
5,325,691 A * 7/1994 Embry .................. E05B 19/205 70/394
5,355,701 A * 10/1994 Tobias ................ E05B 27/0028 70/394
6,062,051 A * 5/2000 Nam .................... A44B 19/301 70/315
6,134,928 A * 10/2000 Kang .................... E05B 19/205 70/394
6,181,025 B1 * 1/2001 McConnell ............. B60R 25/20 340/426.3
6,415,523 B1 * 7/2002 Wood .................. E05B 19/0011 70/460
9,133,646 B1 * 9/2015 Jennings ............... E05B 19/205
11,208,830 B2 12/2021 Capehart et al.
11,408,200 B1 8/2022 Capehart et al.
2005/0178172 A1 * 8/2005 McGettrick ............... E05B 9/08 70/58
2021/0372160 A1 * 12/2021 Capehart ............... E05B 19/205
2024/0368919 A1 * 11/2024 Riesel ................. E05B 19/0011
2025/0198194 A1 * 6/2025 Capehart ............. E05B 19/0011

* cited by examiner

*Primary Examiner* — Mark A Williams
(74) *Attorney, Agent, or Firm* — Dunlap Bennett & Ludwig, PLLC

(57) ABSTRACT

A lock decoding device includes an alignment dial comprising an indicator rod extending from a top surface. The lock decoding device further includes an indicator dial comprising a feeler tip rod extending from a bottom surface. The feeler tip rod extends through the alignment dial. The indicator rod extends through an indicator window of the indicator dial. When the indicator dial is rotated, the feeler tip rod rotates to enable a feeler tip to contact a wafer of a lock cylinder, and the indicator rod moves within the indicator window to indicate a wafer position of the wafer.

10 Claims, 17 Drawing Sheets

APPARATUS AND METHOD FOR DECODING A KEYED LOCK CYLINDER

CROSS-REFERENCE TO RELATED APPLICATIONS

This application claims the benefit of priority of U.S. provisional application No. 63/611,906, filed Dec. 19, 2023, titled "APPARATUS AND METHOD FOR DECODING A KEYED LOCK CYLINDER," the entire contents of which are herein incorporated by reference.

FIELD

The present invention relates to keylocks, and more particularly to devices and methods for decoding a key lock cylinder.

BACKGROUND

Keyed lock cylinders and rekeyable lock cylinders, such as The Kwikset Smart Key locks are very difficult to unlock when the key is not accessible. The process of unlocking these locks when no key is available often requires destructive measures to the lock itself.

As can be seen, there is a need for non-destructive devices and methods for decoding a key lock cylinder.

SUMMARY

In one aspect of the present disclosure, a lock decoding device includes an alignment dial comprising an indicator rod extending from a top surface. The lock decoding device further includes an indicator dial comprising a feeler tip rod extending from a bottom surface. The feeler tip rod extends through the alignment dial. The indicator rod extends through an indicator window of the indicator dial. When the indicator dial is rotated, the feeler tip rod rotates to enable a feeler tip to contact a wafer of a lock cylinder, and the indicator rod moves within the indicator window to indicate a wafer position of the wafer.

In another aspect of the present disclosure, a lock decoding method includes inserting a feeler tip rod of a lock decoding device into a lock until a feeler tip of the feeler tip enters a cylinder of the lock. The lock decoding device includes an alignment dial comprising an indicator rod extending from a top surface, and an indicator dial comprising the feeler tip rod extending from a bottom surface through the alignment dial. The indicator rod extends through an indicator window of the indicator dial. A series of alpha-numeric labels are positioned adjacent to the indicator window. The method includes rotating the indicator dial until the feeler tip engages with a wafer of the cylinder. The indicator rod moves within the indicator window as the indicator dial is rotated. The method includes reading one or the alpha-numeric labels that is aligned with the indicator rod.

DETAILED DESCRIPTION OF THE DISCLOSURE

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

Current lock cylinder decoders require a locksmith to look into a keyhole with a magnifying device while shining an external light source on the lock. The locksmith relies on eyesight to determine the wafer setting for the lock cylinder. The external illumination and aperture of the keyhole limit the visibility of the wafers within the lock cylinder. The speed and efficiency of creating a key for the cylinder utilizing these decoders is reliant on the skill and abilities of the locksmith. If the locksmith is unable to identify the wafer setting, the locksmith may be required to destroy the lock.

Broadly, an embodiment of the present invention provides a lock decoding device that decodes wafer or pin positions of a lock cylinder. The lock decoding device includes an alignment dial and an indicator dial. The lock decoding device includes a feeler tip rod that extends from the indicator dial through the alignment dial. The lock decoding device also includes an indicator rod that extends from the alignment dial through an indicator window of the indicator dial. The indicator window is labeled with wafer positions of a lock cylinder. In operation, the feeler tip rod is inserted into the lock into position within the lock cylinder. Then the alignment dial is abutted against the lock, thereby locking the tool into place which prevents rotational twisting while decoding.

The indicator dial is then rotated, thereby rotating the feeler tip rod. As the feeler tip rod rotates, a feeler tip located on the feeler tip rod, contacts the wafer within the lock cylinder. Because the alignment dial is stationary against the lock, the indicator rod moves within the indicator window as the indicator dial is rotated. When the feeler tip contacts the wafer, the indicator rod aligns with one of the wafer positions labeled on the face of the indicator dial, thereby indicating the wafer position of the lock cylinder. The feeler tip rod can then be inserted further into the lock cylinder to decode another wafer position.

As such, the lock decoder device decodes a lock without requiring visual inspection of the internals of the lock cylinder. As such, the lock decoder device can decode lock wafers that may be deep within the lock cylinder and not easily accessible or viewable.

Referring to FIGS. 1-15, FIGS. 1-10 illustrate a lock decoding device 100, according to aspects of the present disclosure. While FIGS. 1-10 illustrate various components of the lock decoding device 100, additional components can be added, and existing components can be removed.

Figure 1:
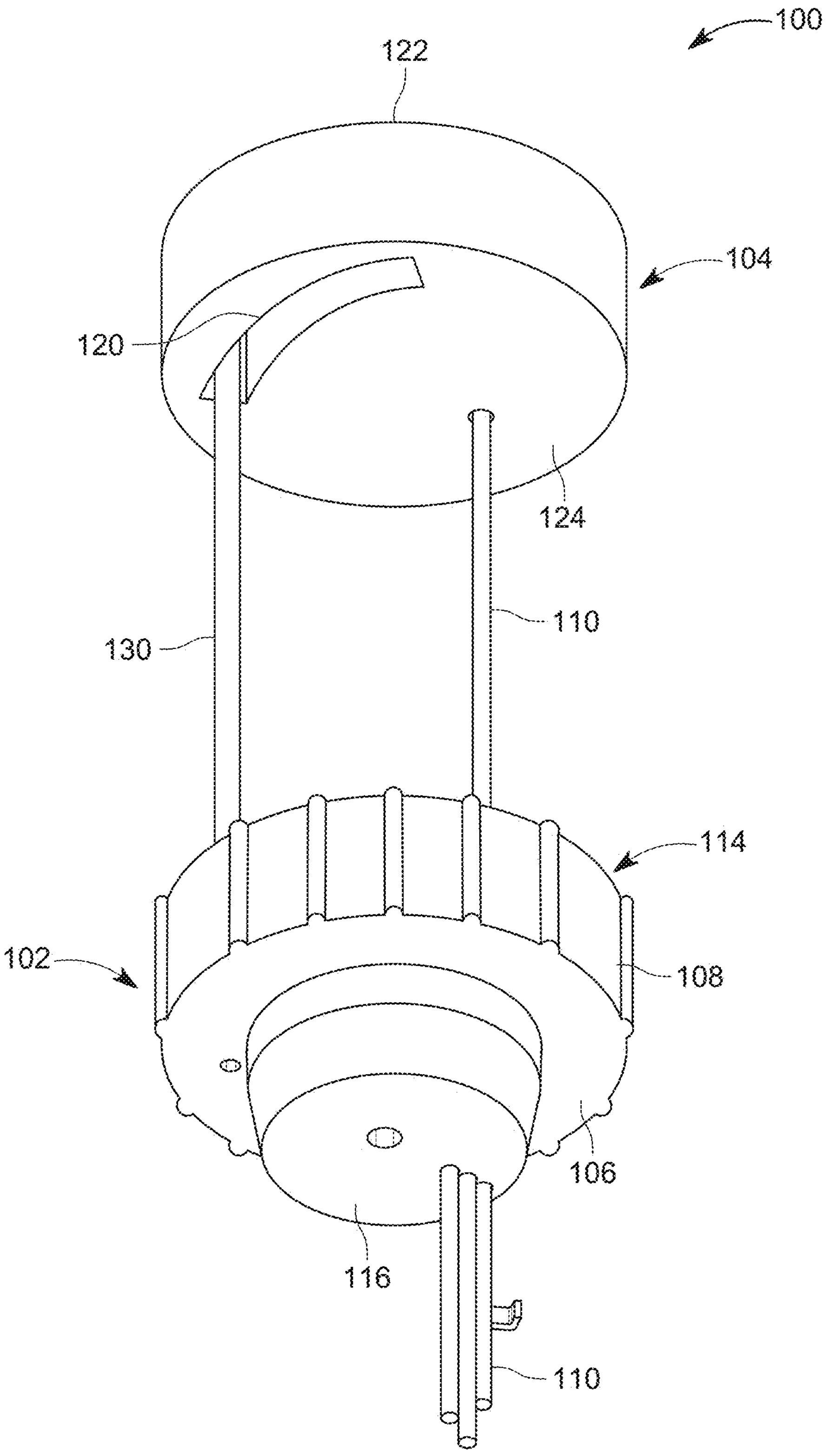
FIG. 1 is a perspective view of a lock decoding device, according to aspects of the present disclosure.
Figure 2:
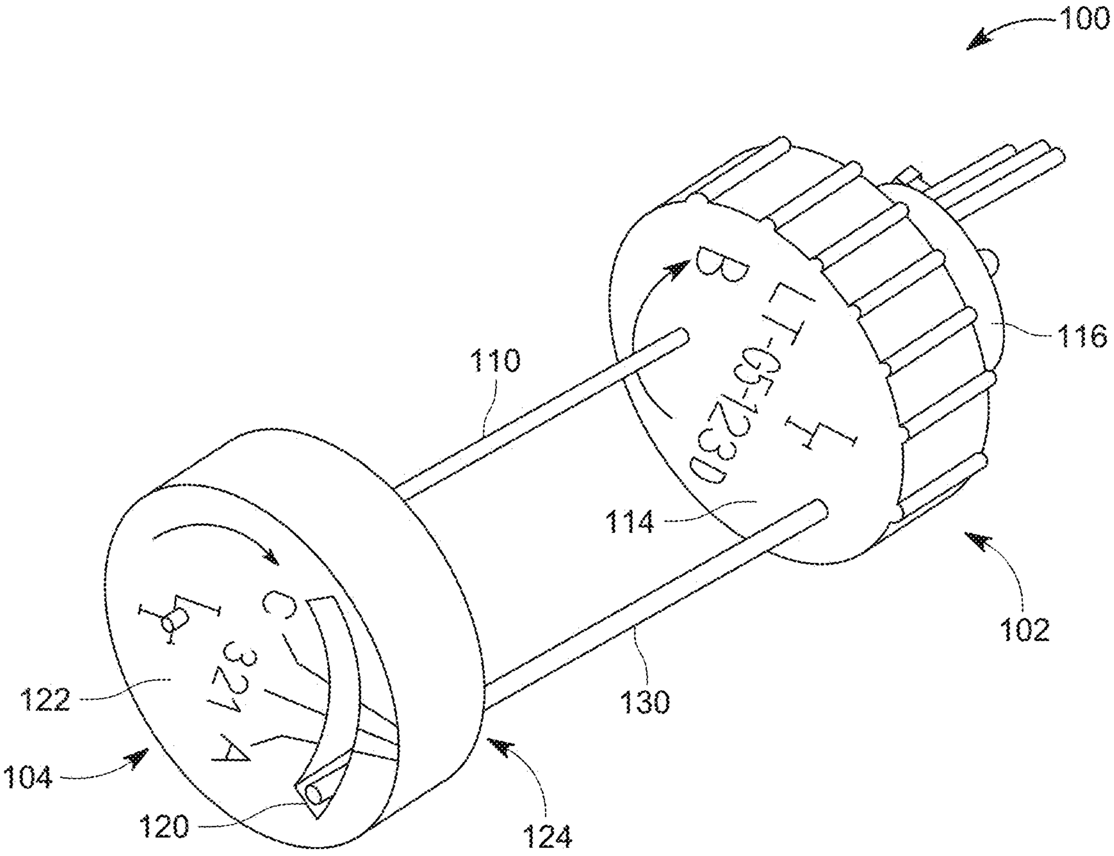
FIG. 2 is another perspective view of the lock decoding device of FIG. 1, according to aspects of the present disclosure.
Figure 3:
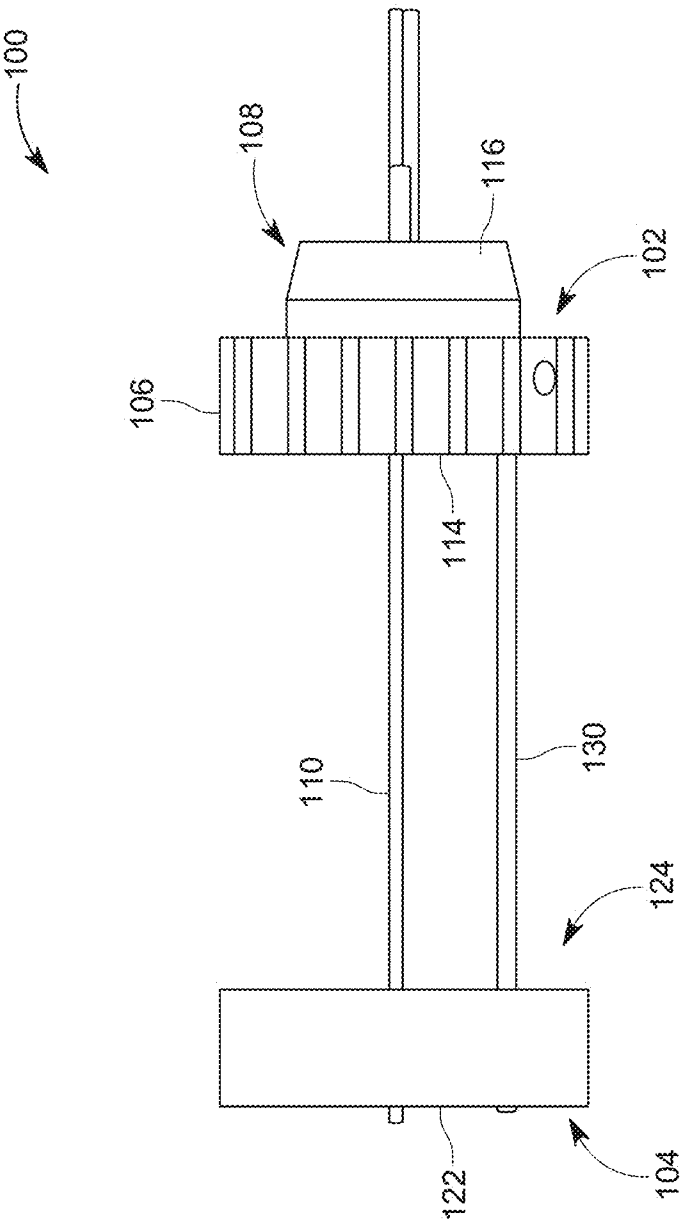
FIG. 3 is a side view of the lock decoding device of FIG. 1, according to aspects of the present disclosure.
Figure 7A:
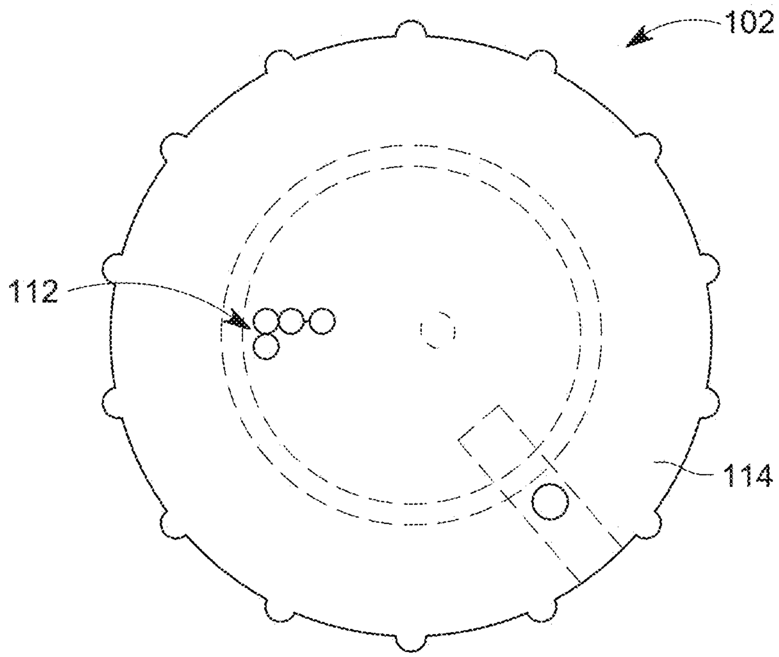
FIGS. 7A-7C are various views of an alignment dial of the lock decoding device of FIG. 1, according to aspects of the present disclosure.
Figure 7B:
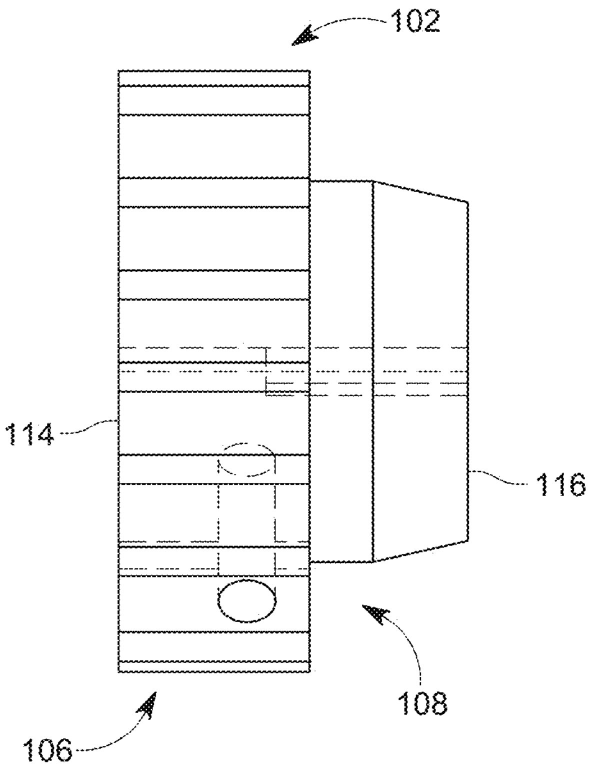
Figure 7C:
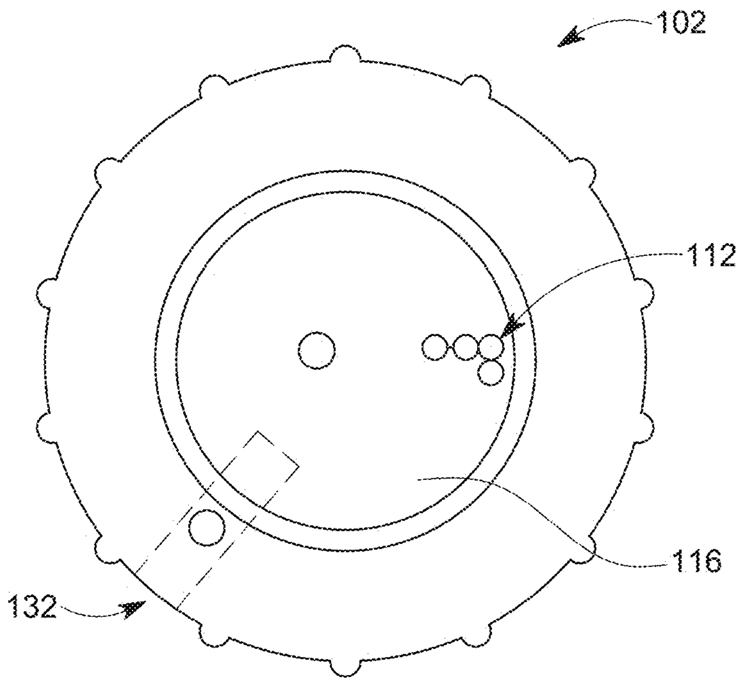

As illustrated in FIGS. 1 and 2, which are perspective views, and FIG. 3, which is a side view, the lock decoding device 100 includes an alignment dial 102 and an indicator dial 104. As illustrated in FIGS. 7A, 7B, and 7C, which are a top view, a side view, and a bottom view of the alignment dial 102, the alignment dial 102 can include a base 106 and a support dial 108. The base 106 can have a tapering cylindrical shape. The support dial 108 can have a cylindrical shape with a diameter greater than the base 106.

Figure 5:
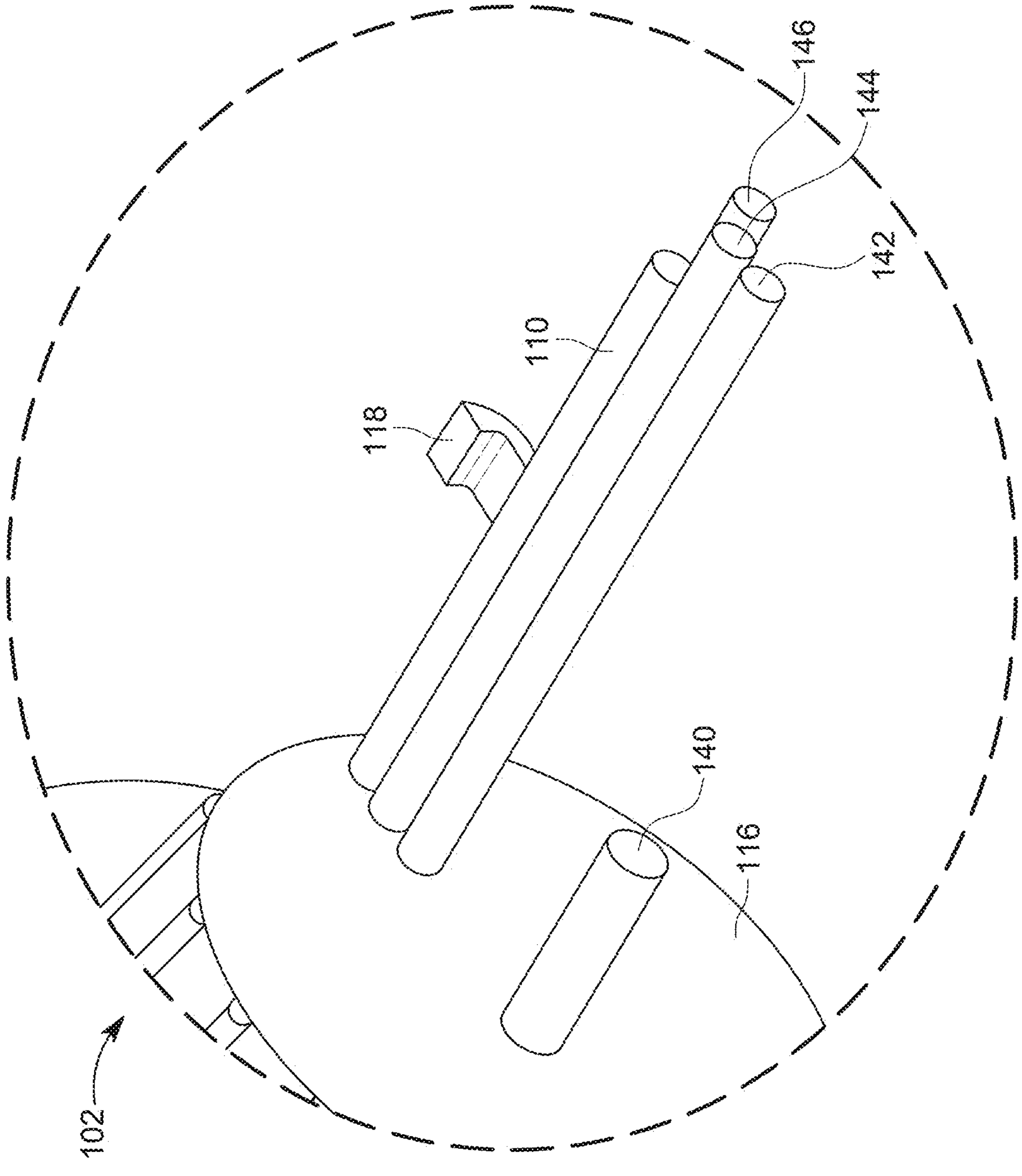
FIG. 5 is an enlarged view of the lock decoding device of FIG. 1, according to aspects of the present disclosure.
Figure 6A:
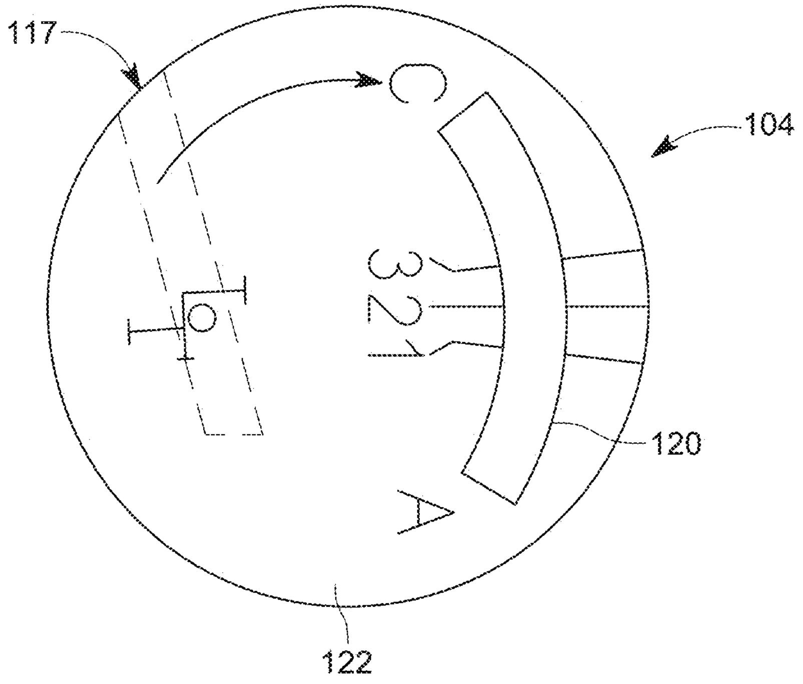
FIGS. 6A-6C are various views of an indicator dial of the lock decoding device of FIG. 1, according to aspects of the present disclosure.
Figure 6B:
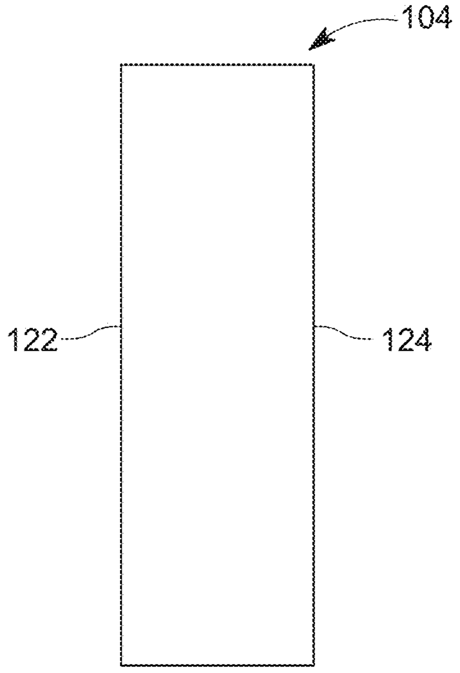
Figure 6C:
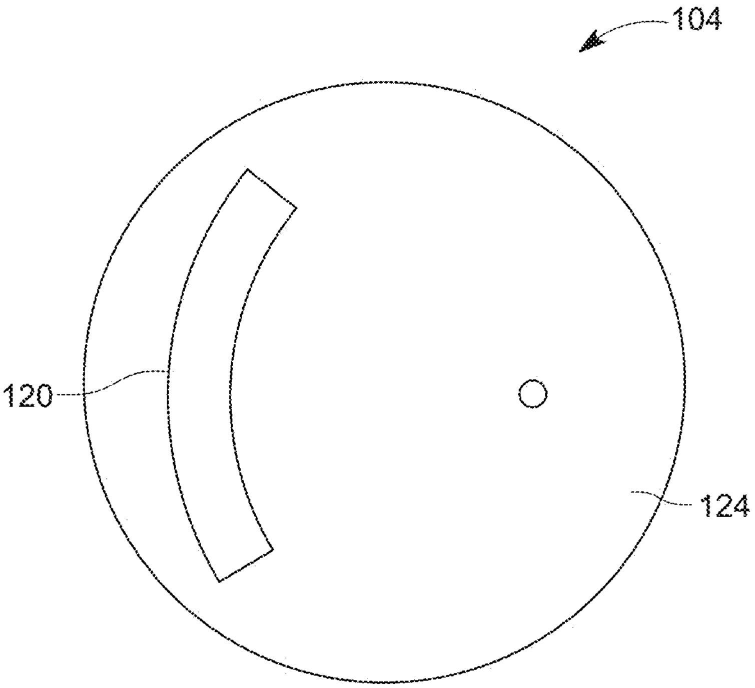

As illustrated in FIGS. 6A, 6B, and 6C, which are a top view, a side view, and a bottom view of the indicator dial 104, the indicator dial 104 includes an indicator window 120 formed through the indicator dial 104 from a top surface 122 to a bottom surface 124. The indicator window 120 can be curved to match the curve of the indicator dial 104. The indicator dial 104 includes a feeler tip rod 110 that passes through a feeler rod channel 112 formed in the alignment dial 102. The feeler rod channel 112 can be formed through the alignment dial 102 from a top surface 114 to a bottom surface 116. The feeler tip rod 110 can be coupled to the indicator dial by a set screw accessible through a set screw hole 117, as illustrated in FIG. 6A. The feeler tip rod 110 includes a feeler tip 118 coupled to the proximal end of the feeler tip rod 110. For example, as illustrated in FIG. 5, the feeler tip 118 can be positioned a distance from the proximal end of the feeler tip rod 110.

Figure 8:
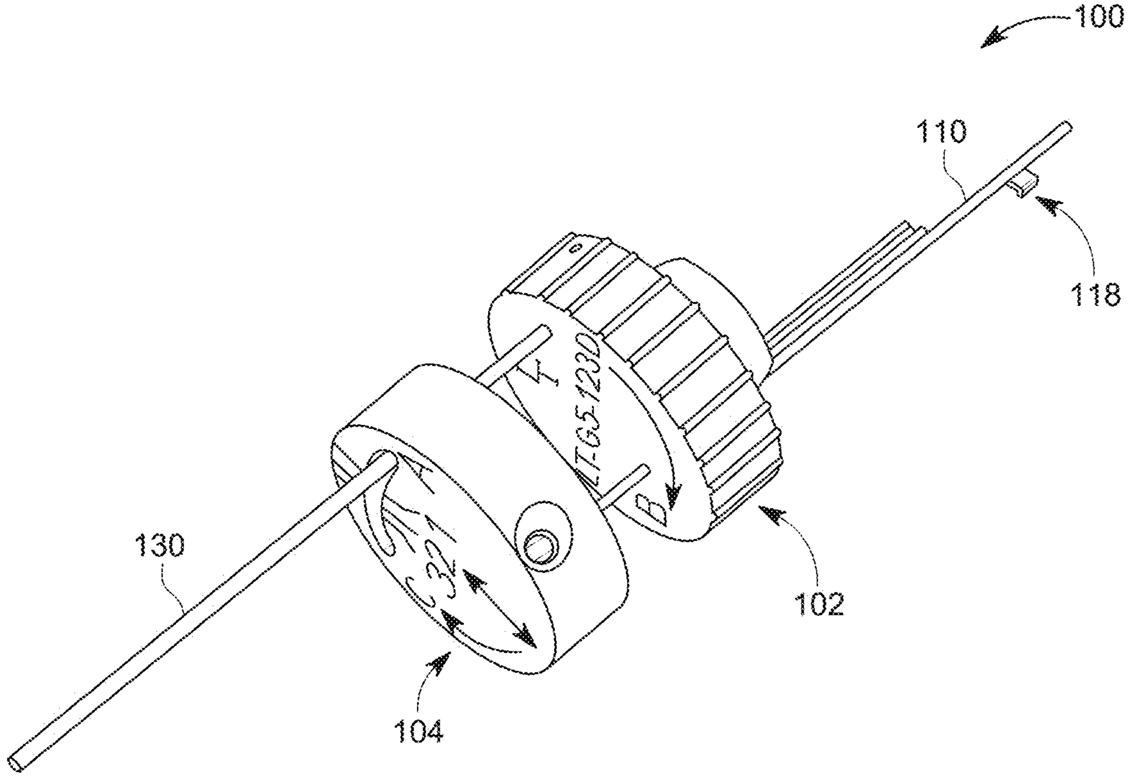
FIGS. 8-10 are additional views of the lock decoding device of FIG. 1, according to aspects of the present disclosure.

As illustrated in FIG. 1-3, the alignment dial 102 includes an indicator rod 130 that extends from the top surface 114 of the alignment dial 102. The indicator rod 130 extends through the indicator window 120 of the indicator dial 104. The indicator rod 130 can be coupled to the alignment dial 102 by a set screw accessible through a set screw hole 132, as illustrated in FIG. 7C. The indicator rod 130 operates to indicate a wafer position of a lock cylinder, for example, align with alpha-numeric indications on the top surface 122 of the indicator dial 104, shown in FIG. 10 and described below in further detail. Additionally, as illustrated in FIGS. 8 and 10, the feeler tip rod 110 can slide within the feeler rod channel 112, thereby allowing the alignment dial 102 and the indicator dial 104 to move relative to one another.

Figure 4:
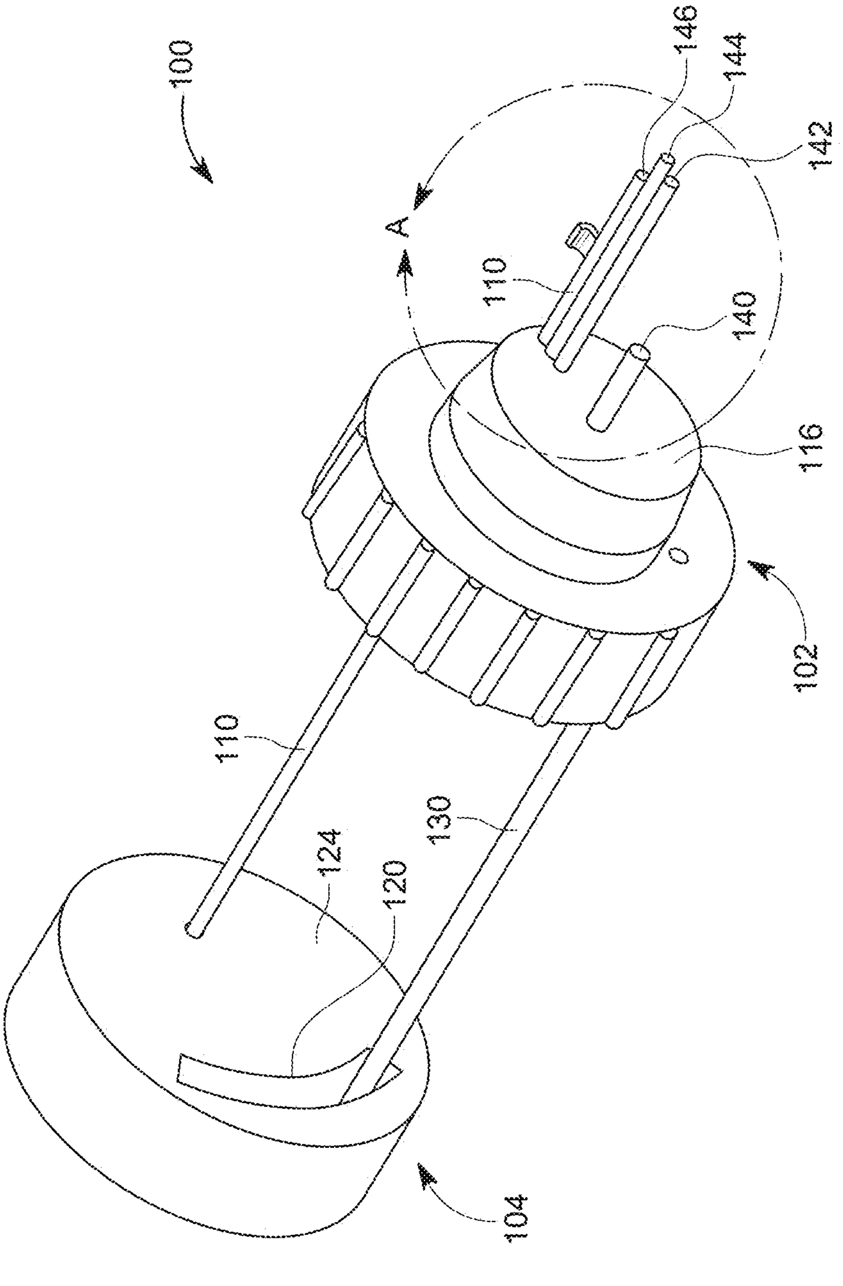
FIG. 4 is another perspective view of the lock decoding device of FIG. 1, according to aspects of the present disclosure.

As illustrated in FIG. 4 and FIG. 5, which is an enlarged view, the alignment dial 102 includes a fixed alignment rod 140 and several fixed support rods, e.g., a fixed support rod 142, a fixed support rod 144, and a fixed support rod 146. The fixed alignment rod 140 is coupled to and extends from the bottom surface 116 of the alignment rod 140. The alignment rod 140 operates to align the lock decoding device with a lock to be decoded. The fixed support rod 142, the fixed support rod 144, and the fixed support rod 146 are coupled to and extend from the bottom surface 116 of the alignment rod 102. For example, the fixed support rod 142, the fixed support rod 144, and the fixed support rod 146 can be positioned adjacent to the feeler rod channel 112. The fixed support rod 142, the fixed support rod 144, and the fixed support rod 146 operated to enter the lock cylinder through the lock keyhole and provide structural support during the lock decoder device 100 operation.

Figure 9:
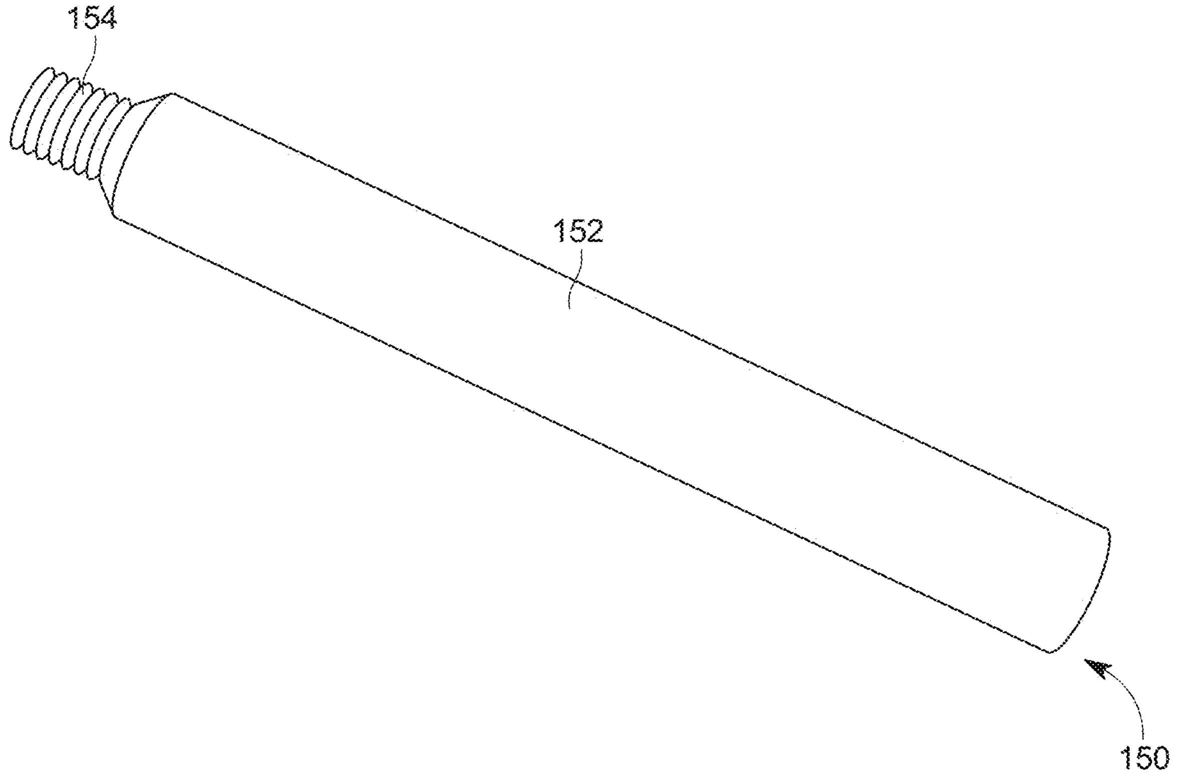
Figure 10:
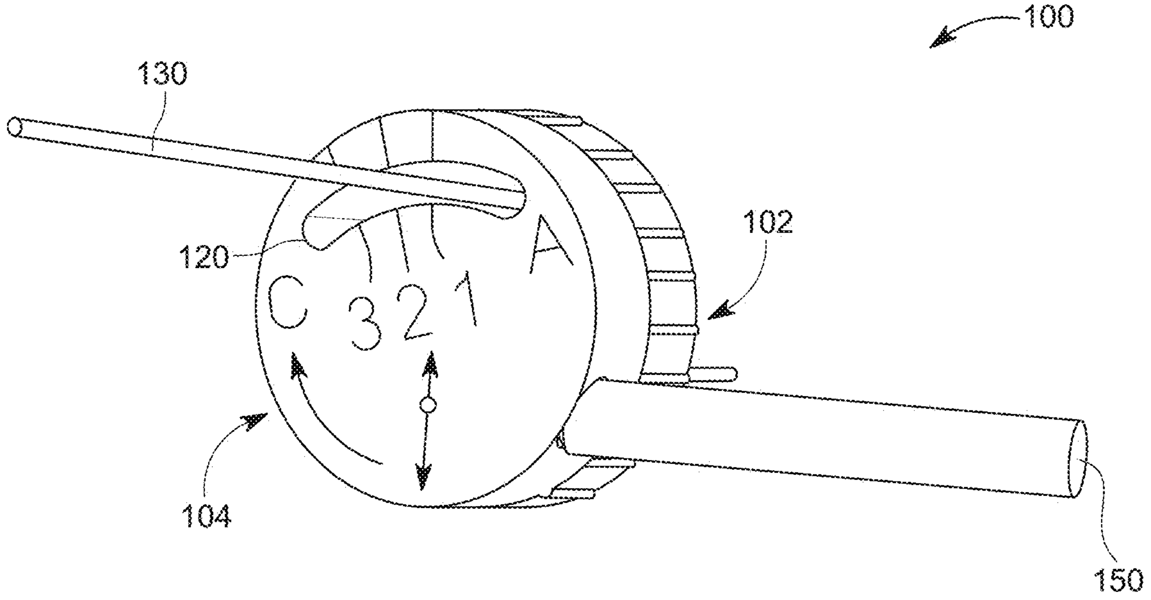

In some embodiments, as illustrated in FIGS. 9 and 10, the lock decoder device 100 can include a finesse bar 150 to increase the touch or "feel" sensitivity when operating the lock decoder device 100. The finesse bar 150 can include a bar cylinder 152 with a threaded end 154. The finesse bar 150 can be removably coupled to the indicator dial 104 at the set screw hole 117. The finesse bar 150 operates to provide a gripping surface to rotate the indicator dial 104 during the operation of the lock decoding device 100.

Figure 11:
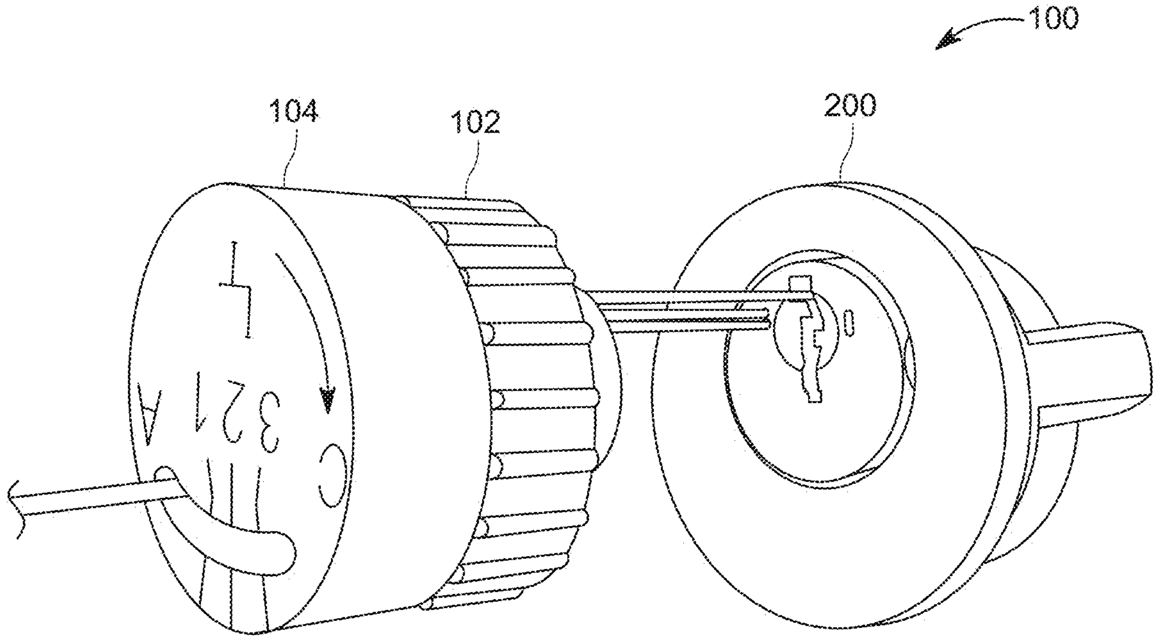
FIGS. 11-15 are views of an operation of the lock decoding device of FIG. 1, according to aspects of the present disclosure.
Figure 12:
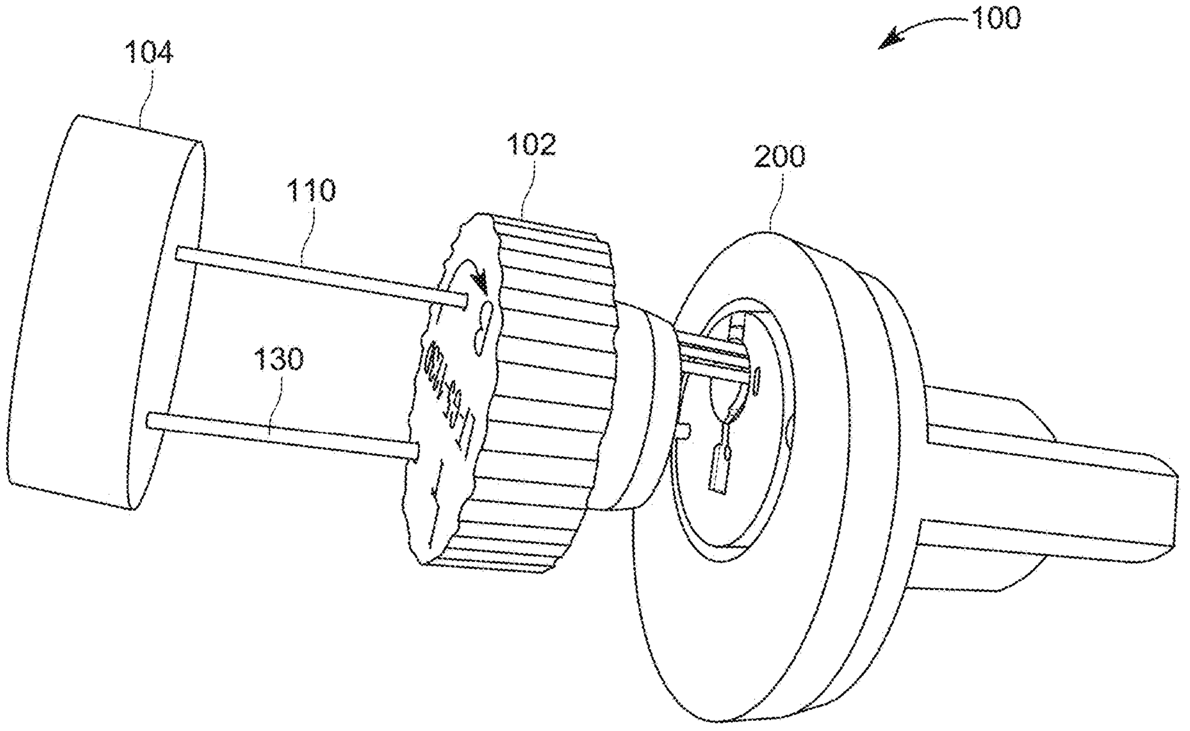
Figure 13:
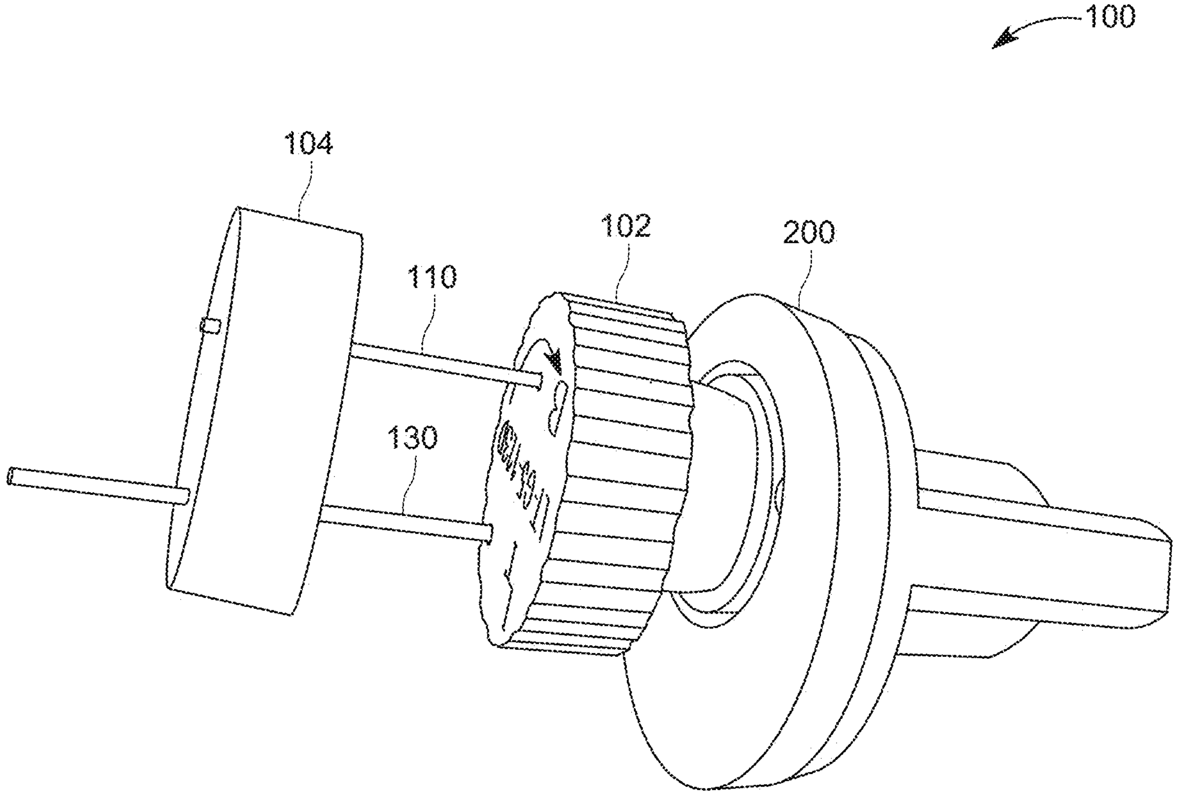

FIG. 11-15 illustrates an operation of the lock decoding device 100. In operation, as shown in FIG. 11, the alignment dial 102 and the indicator dial 104 are moved together such that the top surface 114 of the alignment dial 102 abuts the bottom surface 124 of the indicator dial 104. The feeler tip rod 110 is inserted into the lock cylinder. The alignment dial 102 is aligned with a lock 200 being decoded. Once aligned, the alignment dial 102 is secured against the face of the lock 200, as illustrated in FIGS. 12 and 13. As the alignment dial is secured, the alignment rod 140 and the fixed support rods enter the keyhole of the lock 200 to maintain alignment and provide structural support during the decoding.

Figure 14:
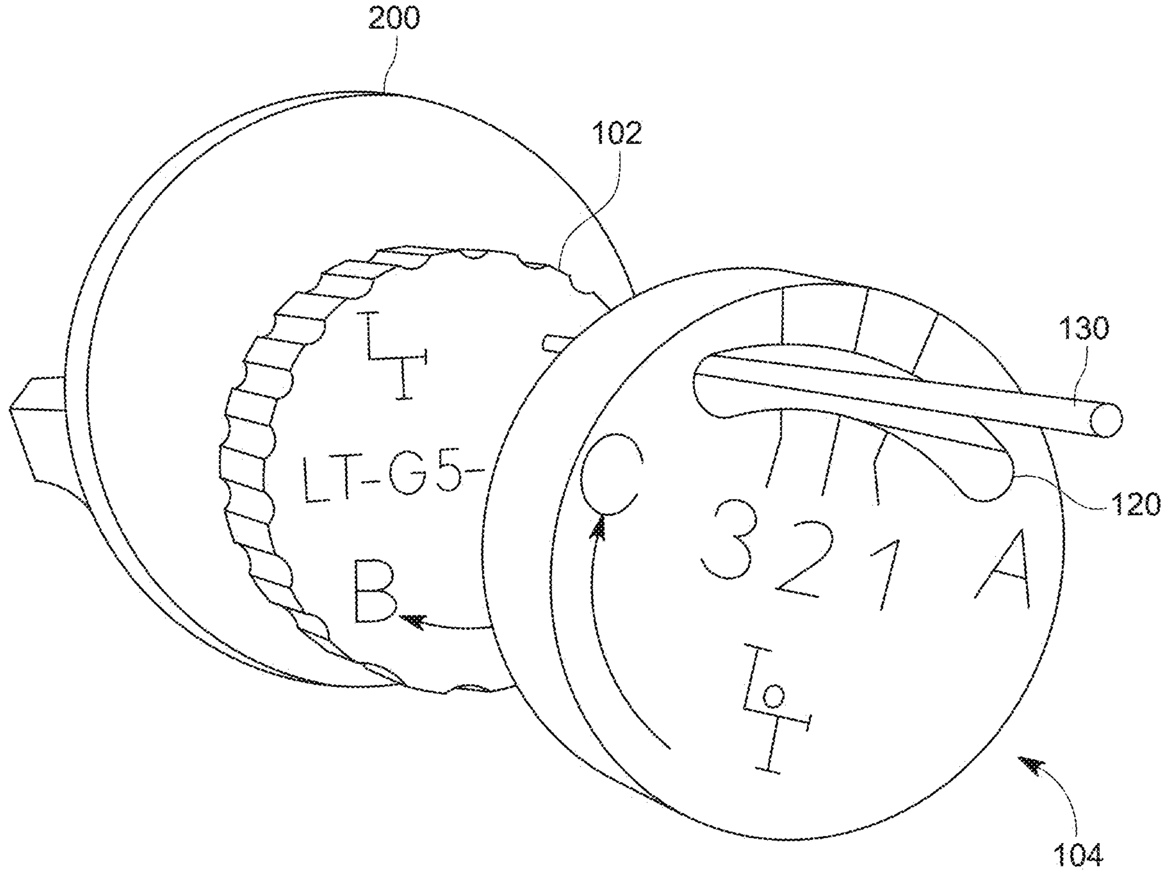
Figure 15:
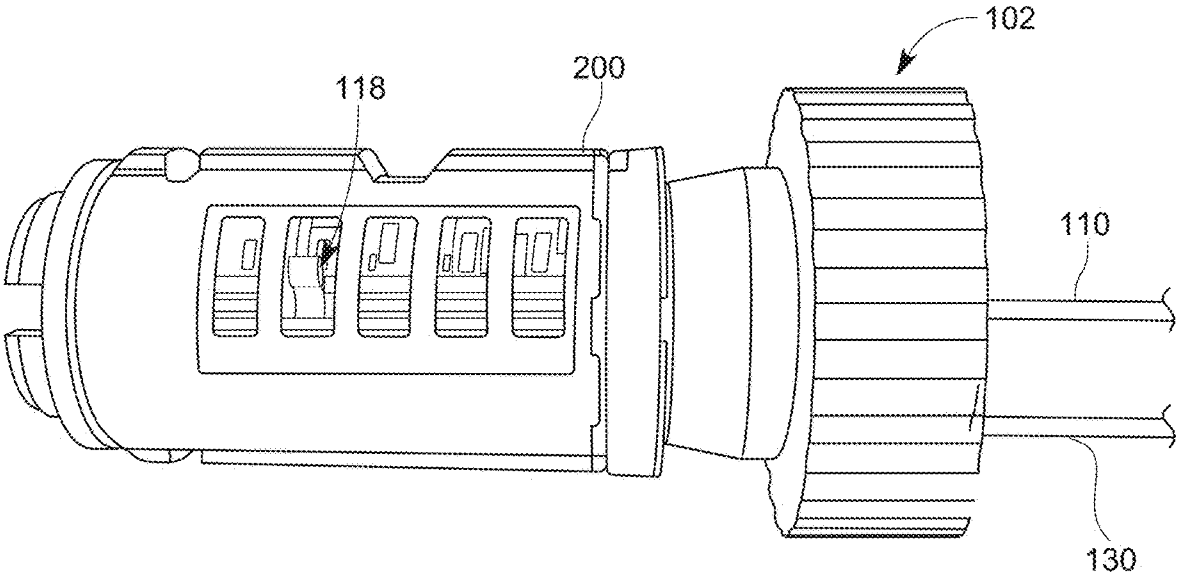

The indicator dial 104 is then rotated, thereby rotating the feeler tip rod 110. As the feeler tip rod 110 rotates, the feeler tip 118, located on the feeler tip rod 110, contacts the wafer within the lock cylinder, as illustrated in FIG. 15. Because the alignment dial 102 is stationary against the lock 200, the indicator rod 130 moves within the indicator window 120 as the indicator dial 104 is rotated, as illustrated in FIG. 14. When the feeler tip 118 contacts the wafer, the indicator rod 130 aligns with one of the wafer positions labeled on the top surface 122 of the indicator dial 104, thereby indicating the wafer position of the lock cylinder. The feeler tip rod 110 can then be inserted further into the lock cylinder to decode another wafer position. In some embodiments, the lock decoding device 100 can be utilized with other types of lock decoding devices, for example, a decoder device disclosed in U.S. Pat. Nos. 11,408,200 and 11,208,830, the entire contents of which are incorporated by reference herein.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

It should be understood, of course, that the foregoing relates to exemplary embodiments of the disclosure and that modifications can be made without departing from the spirit and scope of the disclosure as set forth in the following claims.

What is claimed is:

1. A lock decoding device, comprising:
- an alignment dial comprising an indicator rod extending from a top surface; and
- an indicator dial comprising a feeler tip rod extending from a bottom surface; wherein:
  - the feeler tip rod extends through the alignment dial,
  - the indicator rod extends through an indicator window of the indicator dial, and
  - when the indicator dial is rotated, the feeler tip rod rotates to enable a feeler tip to contact a wafer of a lock cylinder, and the indicator rod moves within the indicator window to indicate a wafer position of the wafer.

2. The lock decoding device of claim 1, wherein the indicator dial further comprises:
- a series of alpha-numeric labels positioned adjacent to the indicator window, wherein the indicator rod aligns with one of the alpha-numeric labels to indicate a wafer position.

3. The lock decoding device of claim 1, wherein the alignment dial further comprises:
- at least one fixed alignment rod extending from a bottom surface of the alignment dial.

4. The lock decoding device of claim 3, wherein the alignment dial further comprises:
- at least one fixed support rod extending from the bottom surface of the alignment dial.

5. The lock decoding device of claim 1, wherein the alignment dial further comprises:
- a base coupled to a bottom surface of the alignment dial, wherein the base has a frustoconical shape.

6. The lock decoding device of claim 1, wherein the feeler tip rod comprises a feeler tip coupled adjacent to a proximal end of the feeler tip rod.

7. The lock decoding device of claim 1, further comprising:
- a finesse bar removably coupled to a side surface of the indicator dial.

8. A lock decoding method, comprising:
- inserting a feeler tip rod of a lock decoding device into a lock until a feeler tip of the feeler tip enters a cylinder of the lock, the lock decoding device comprising:
  - an alignment dial comprising an indicator rod extending from a top surface, and
  - an indicator dial comprising the feeler tip rod extending from a bottom surface through the alignment dial, wherein:
    - the indicator rod extends through an indicator window of the indicator dial, and
    - a series of alpha-numeric labels are positioned adjacent to the indicator window;
- rotating the indicator dial until the feeler tip engages with a wafer of the cylinder, wherein the indicator rod moves within the indicator window as the indicator dial is rotated; and
- reading one or the alpha-numeric labels that is aligned with the indicator rod.

9. The lock decoding method of claim 8, further comprising:
- advancing or retracting the feeler tip rod of the lock decoding device;
- rotating the indicator dial until the feeler tip engages with a new wafer of the cylinder; and
- reading one or the alpha-numeric labels that is aligned with the indicator rod.

10. The lock decoding method of claim 8, further comprising:
- aligning an alignment rod of the lock decoding device with the lock prior to insertion.

* * * * *